US011733591B2

(12) United States Patent
Watazawa et al.

(10) Patent No.: US 11,733,591 B2
(45) Date of Patent: Aug. 22, 2023

(54) IMAGE CAPTURING APPARATUS, ACCESSORY, METHOD FOR CONTROLLING IMAGE CAPTURING APPARATUS, AND NON-TRANSITORY COMPUTER-READABLE STORAGE MEDIUM, RELATED TO CONTROL OF POWER SUPPLY FROM IMAGE CAPTURING APPARATUS TO ACCESSORY

(71) Applicant: CANON KABUSHIKI KAISHA, Tokyo (JP)

(72) Inventors: Yasuyuki Watazawa, Tokyo (JP); Naoto Fujihashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 16/705,020

(22) Filed: Dec. 5, 2019

(65) Prior Publication Data

US 2020/0192193 A1    Jun. 18, 2020

(30) Foreign Application Priority Data

Dec. 14, 2018  (JP) ................................ 2018-234729

(51) Int. Cl.
*G03B 17/14*   (2021.01)
*G03B 17/18*   (2021.01)
*G02B 7/36*    (2021.01)
*G03B 15/05*   (2021.01)

(52) U.S. Cl.
CPC ............. *G03B 17/14* (2013.01); *G03B 17/18* (2013.01); *G02B 7/36* (2013.01); *G03B 15/05* (2013.01); *G03B 2215/056* (2013.01)

(58) Field of Classification Search
CPC ........ G03B 17/12; G03B 17/14; G03B 17/18; G03B 15/05; G03B 2217/00; G03B 2217/002; G03B 2217/007; G03B 2215/056
See application file for complete search history.

(56) References Cited

U.S. PATENT DOCUMENTS

2018/0348597 A1*   12/2018   Tamura ................... G03B 17/56

FOREIGN PATENT DOCUMENTS

| JP | 2001-013569 A | 1/2001 |
| JP | 2017054066 A | 3/2017 |
| JP | 2018072464 A | 5/2018 |
| WO | 2018139170 A1 | 8/2018 |

* cited by examiner

*Primary Examiner* — Clayton E. LaBalle
*Assistant Examiner* — Fang-Chi Chang
(74) *Attorney, Agent, or Firm* — Canon U.S.A., Inc. I.P. Division (57) ABSTRACT

An image capturing apparatus includes a plurality of terminals including a terminal used for electrical connection with an accessory, and a first mount portion connectable with a second mount portion on the accessory. With the accessory and the image capturing apparatus detachably attached, a first terminal is configured to output a signal from the image capturing apparatus to the accessory, a second terminal is configured to input a signal output from the accessory to the image capturing apparatus, and a third terminal is configured to supply first power to the accessory. A second signal is detected as a signal input to the second terminal when a first signal is output to the first terminal. When it is detected that the second signal is a signal changing in synchronization with the first signal, the first power is supplied to the accessory via the third terminal.

14 Claims, 9 Drawing Sheets

IMAGE CAPTURING APPARATUS, ACCESSORY, METHOD FOR CONTROLLING IMAGE CAPTURING APPARATUS, AND NON-TRANSITORY COMPUTER-READABLE STORAGE MEDIUM, RELATED TO CONTROL OF POWER SUPPLY FROM IMAGE CAPTURING APPARATUS TO ACCESSORY

BACKGROUND

Field

The present disclosure relates to an image capturing apparatus and an accessory such as an interchangeable lens attachable to the image capturing apparatus. More particularly, the present disclosure relates to an image capturing apparatus and an accessory each having a mount portion with an electrically connectable terminal.

Description of the Related Art

Conventionally, an accessory (camera accessory) attachable to and detachable from an image capturing apparatus is known to be supplied with power from the image capturing apparatus or to transmit and receive various instructions and data to and from the image capturing apparatus in a state where the accessory is attached to the image capturing apparatus. To perform the above-described power supply and communication, an attachment portion called a mount portion on each of the image capturing apparatus and the accessory generally includes a plurality of terminals (electrical contacts) that are electrically connected by coming in contact with each other.

The plurality of terminals arranged on the mount portion often includes an accessory attachment detection terminal used to detect whether an accessory is attached to the image capturing apparatus. This configuration enables the image capturing apparatus, upon detection whether an accessory is attached thereto via the attachment detection terminal, to supply power to and communicate with the accessory by using another terminal among the above-described plurality of terminals.

In general, the mount portion is configured to have the above-described plurality of terminals externally exposed in a state where the accessory is not attached to the image capturing apparatus so that the accessory can be easily attached to and detached from the image capturing apparatus. Thus, there is a possibility that a foreign object gets inside or a terminal failure occurs. Accordingly, the image capturing apparatus can erroneously detect that the accessory is attached to the image capturing apparatus even in a state where the accessory is not attached to the image capturing apparatus. More specifically, the image capturing apparatus may not be able to correctly/accurately detect whether the accessory is attached to the image capturing apparatus based only on output from the above-described attachment detection terminal.

For example, Japanese Patent Application Laid-open No. 2001-013569 discusses a technique for supplying power from an image capturing apparatus to a lens after the image capturing apparatus detects attachment of the lens, but, if communication is not established, interrupting the power supply to prevent a circuit failure.

SUMMARY

According to an aspect of the present disclosure, an image capturing apparatus detachably attached with an accessory, the image capturing apparatus comprising: a plurality of terminals including a terminal used for electrical connection with the accessory, a first mount portion connectable with a second mount portion on the accessory, one or more processors, and memory storing instructions that, when executed by the one or more processors, cause the image capturing apparatus to perform operations including: controlling the plurality of terminals, wherein the plurality of terminals includes a first terminal, a second terminal, and a third terminal, wherein the first terminal is configured to be used to output a signal from the image capturing apparatus to the accessory, the second terminal is configured to be used to input a signal output from the accessory to the image capturing apparatus, and the third terminal is configured to be used to supply first power to the accessory, and wherein controlling includes detecting a second signal as a signal input to the second terminal when a first signal is output to the first terminal and, in a case where it is detected that the second signal is a signal changing in synchronization with the first signal, controlling includes supplying the first power to the accessory via the third terminal.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings.

A first exemplary embodiment of an image capturing system related to an image capturing apparatus and an accessory that can be attached to and detached from the image capturing apparatus of the present disclosure will be described below with reference to FIGS. 1 to 4.

Figure 1:
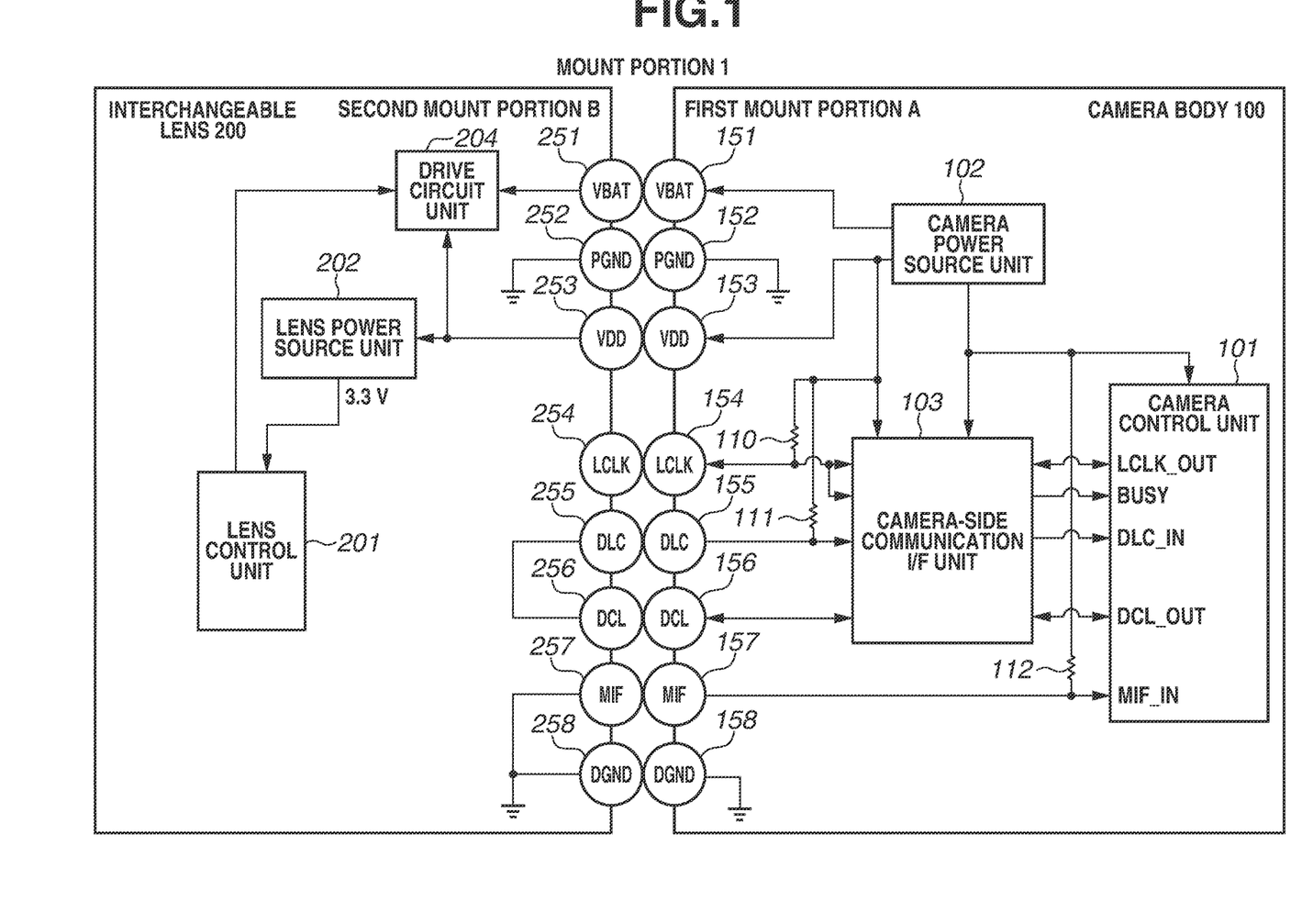
FIG. 1 is a block diagram illustrating an example of internal configurations of a camera and a camera accessory where an interchangeable lens type camera body and a first interchangeable lens are connected with each other according to a first exemplary embodiment of the present disclosure.
Figure 2A:
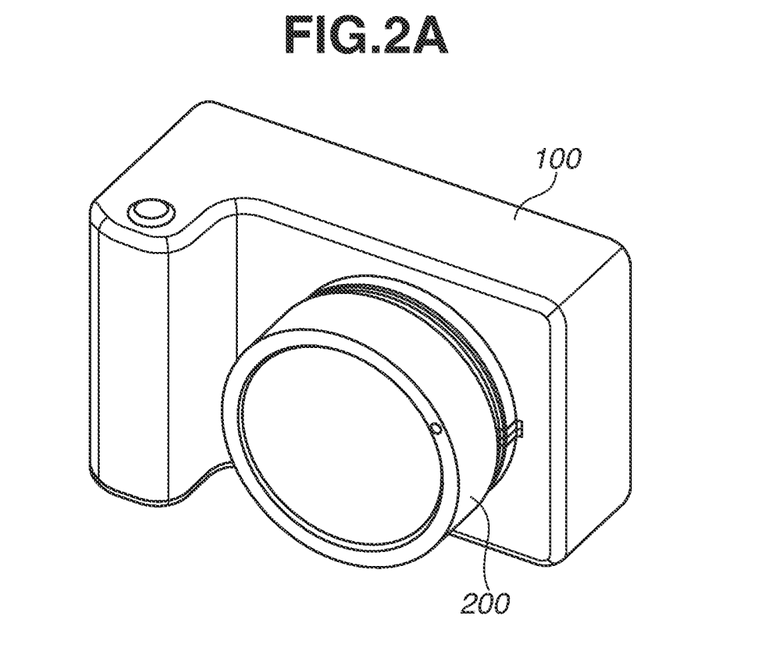
FIGS. 2A and 2B are external perspective views illustrating the camera body and the first interchangeable lens according to the first exemplary embodiment of the present disclosure.
Figure 2B:
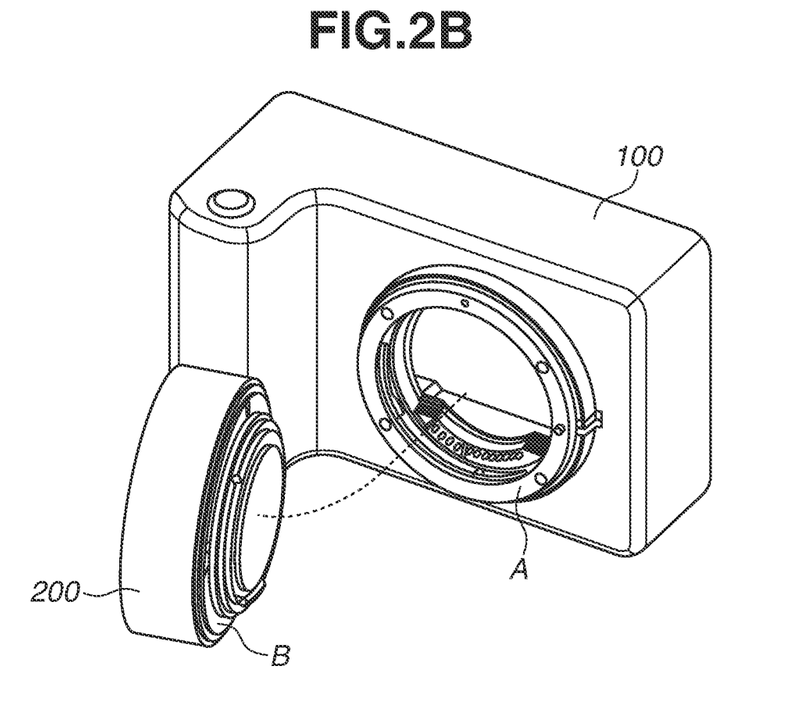
Figure 3:
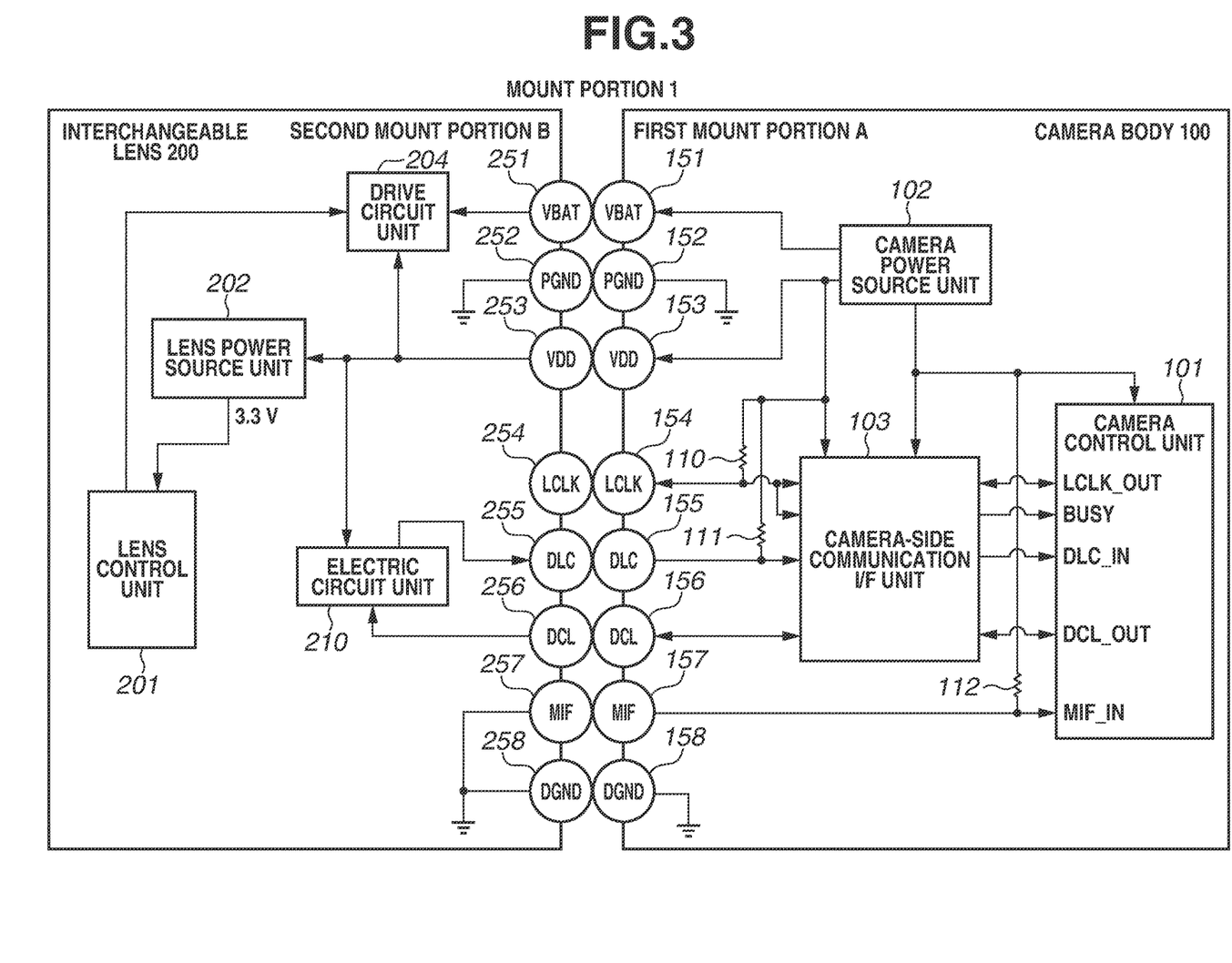
FIG. 3 is a block diagram illustrating an example of a state where the interchangeable lens is connected to the camera body according to a modification of the first exemplary embodiment of the present disclosure.
Figure 4:
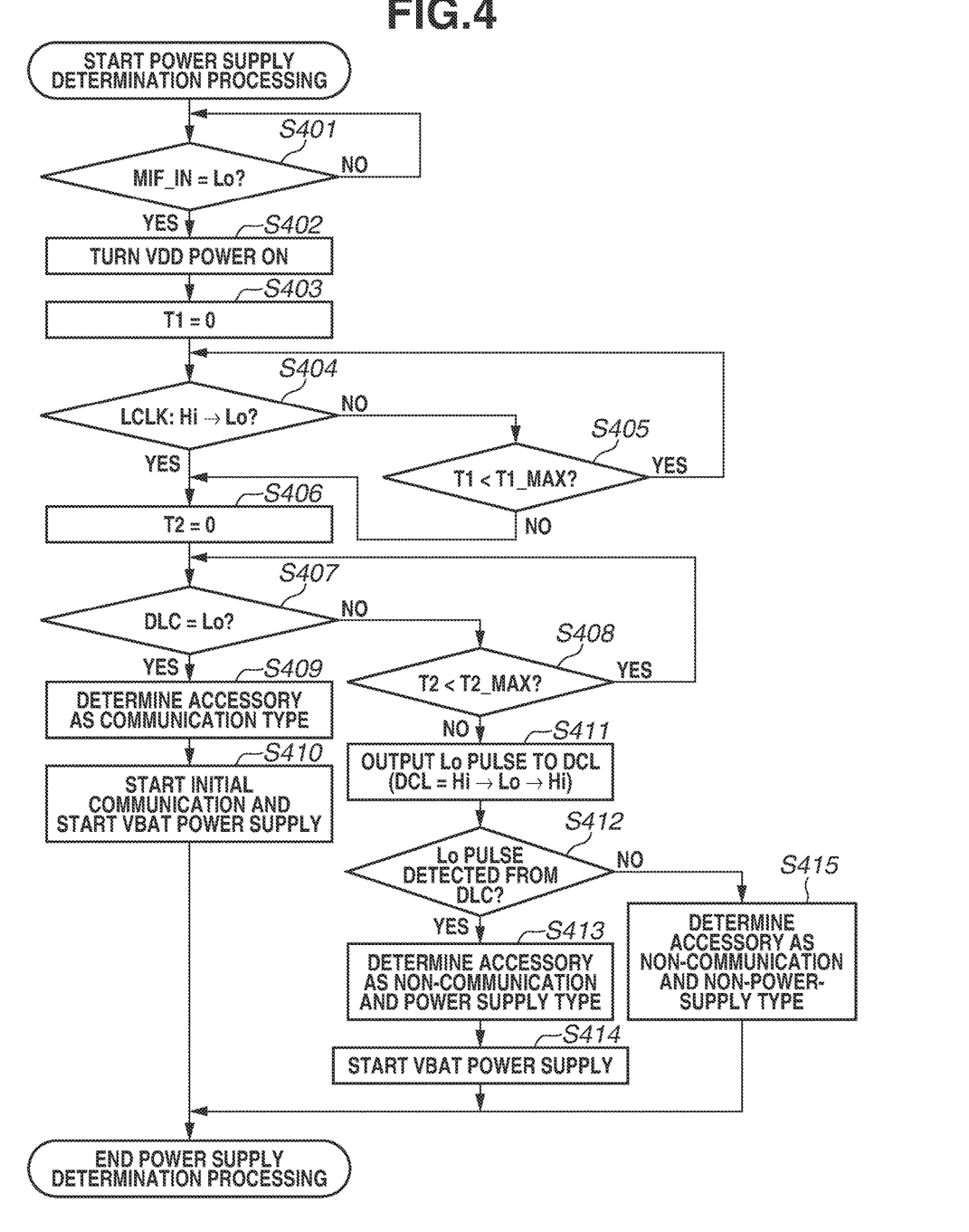
FIG. 4 is a flowchart illustrating power supply determination processing according to the first exemplary embodiment of the present disclosure.
Figure 5:
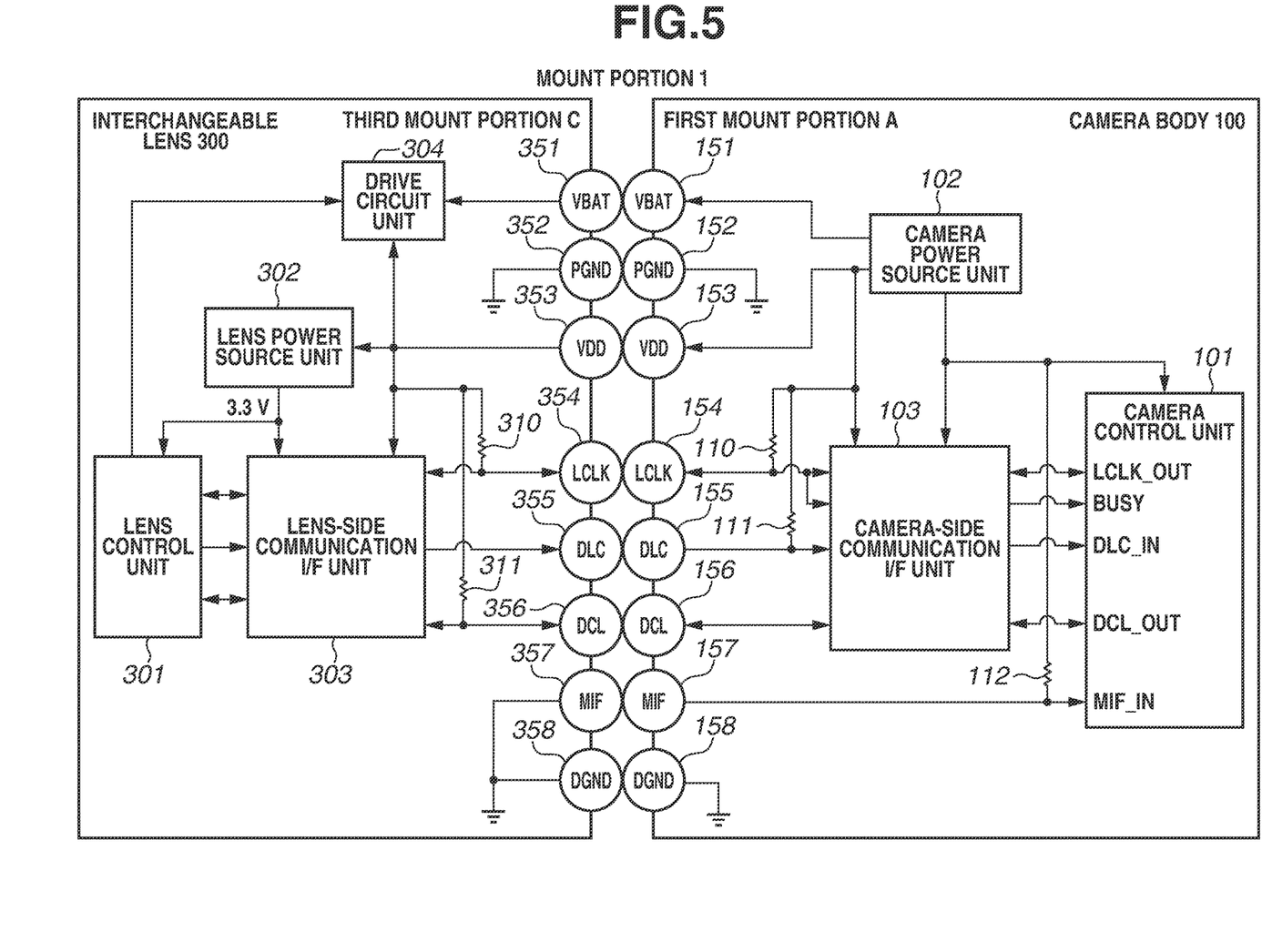
FIG. 5 is a block diagram illustrating an example of internal configurations of a camera and a camera accessory where the camera body and a second interchangeable lens are connected with each other according to the first exemplary embodiment of the present disclosure.

FIG. 1 is a block diagram illustrating an example of internal configurations of a camera and a camera accessory where an interchangeable lens type camera body 100 and a first interchangeable lens 200 are connected with each other according to the first exemplary embodiment of the present disclosure. FIGS. 2A and 2B are external perspective views illustrating the camera body 100 and the first interchangeable lens 200 according to the first exemplary embodiment of the present disclosure. FIG. 2A illustrates a state where the first interchangeable lens 200 is attached to the camera body 100. FIG. 2B illustrates a state where the first interchangeable lens 200 is detached from the camera body 100. FIG. 3 is a block diagram illustrating an example of a state where the first interchangeable lens 200 is connected to the camera body 100 according to a modification of the first exemplary embodiment of the present disclosure. FIG. 4 is a flowchart illustrating power supply determination processing according to the first exemplary embodiment of the present disclosure. FIG. 5 is a block diagram illustrating an example of internal configurations of a camera and a camera accessory where the camera body 100 and a second interchangeable lens 300 are connected with each other according to the first exemplary embodiment of the present disclosure. In FIGS. 1, 3, and 5, the image capturing apparatus (camera body 100) is identical. One or more function blocks illustrated in FIGS. 1, 3, and 5 may be implemented by hardware such as an Application Specific Integrated Circuit (ASIC) and a Programmable Logic Array (PLA) or implemented by a programmable processor such as a central processing unit (CPU) and a microprocessing unit (MPU) executing software. In addition, the function blocks may be implemented by a combination of software and hardware. Thus, in the following descriptions, even if different function blocks are described as operating entities, the function blocks are implementable by the same hardware entity.

Internal configurations of the camera body 100 and the second interchangeable lens 300 will be described below with reference to FIG. 5. The second interchangeable lens 300 is capable of communicating with the camera body 100 via a plurality of terminals (described below) on the mount portion.

As illustrated in FIG. 5, the camera body 100 includes a camera control unit 101, a camera power source unit 102, and a camera-side communication interface (I/F) unit 103. The camera control unit 101 includes a microcomputer incorporating a CPU that is a central operation control unit, and controls the camera body 100 and the second interchangeable lens 300 attached to the camera body 100.

The camera control unit 101 includes an internal memory (not illustrated) that is a recording medium capable of recording data related to operation of the camera body 100 and various types of data acquired by using the camera body 100. The memory according to the present exemplary embodiment includes a read only memory (ROM) area as a nonvolatile memory and a random access memory (RAM) area as a volatile memory. Instead of being provided inside the camera control unit 101, the memory may be provided outside the camera control unit 101 and electrically connected with the camera control unit 101.

Under the control of the camera control unit 101, the camera power source unit 102 generates various power sources, supplies power to each block of the camera body 100, and supplies power to the second interchangeable lens 300 at the same time. The camera-side communication I/F unit 103 changes a voltage level of a communication signal transmitted and received to and from the second interchangeable lens 300 via a mount portion (described below).

The second interchangeable lens 300 includes a lens control unit 301, a lens power source unit 302, a lens-side communication I/F unit 303, and a drive circuit unit 304. The lens control unit 301 includes a microcomputer incorporating a CPU that is a central operation control unit, and controls the second interchangeable lens 300. Under the control of the lens control unit 301, the lens power source unit 302 generates various power sources based on power received from the camera body 100 and supplies power to each block of the second interchangeable lens 300.

The lens-side communication I/F unit 303 changes a voltage level of a communication signal transmitted and received to and from the camera body 100 via a mount portion (described below). The drive circuit unit 304 controls an actuator as a drive source for implementing movement of a diaphragm and various lenses (not illustrated) in the second interchangeable lens 300 based on instructions of the lens control unit 301.

As illustrated in FIG. 5, each of a first mount portion A on the camera body 100 and a third mount portion C on the second interchangeable lens 300 is provided with a plurality of terminals as a plurality of electrical contacts that enables electrical connection. In the camera body 100, the plurality of terminals (camera terminals) is exposed outside the camera body 100 as a plurality of electrical contact pins on the first mount portion A. In the second interchangeable lens 300, the plurality of terminals (accessory terminals) is exposed outside the second interchangeable lens 300 as a plurality of electric contact surfaces on the third mount portion C. In a state where the second interchangeable lens 300 is attached to the camera body 100, the plurality of terminals physically comes into contact with the corresponding terminals, respectively, thereby achieving electrical connections between corresponding contacts. The first mount portion A on the camera body 100 and a mount portion on various interchangeable lenses are collectively referred to as a mount portion 1.

The first mount portion A of the camera body 100 and the third mount portion C of the second interchangeable lens 300 are provided with a mechanical locking mechanism and a mount holding mechanism (not illustrated); however, descriptions thereof will be omitted.

(Descriptions of Various Terminals of Mount Portion 1)

A function of a terminal common to the first mount portion A and the third mount portion C will be described below. VBAT terminals 151 and 351 are terminals used for supplying a driving power source (VBAT or voltage of the battery), which is driving power for operating a mechanical drive unit of the actuator for driving a diaphragm and a focusing lens, from the camera body 100 to the accessory. In other words, the VBAT terminals 151 and 351 are used to supply power other than communication power (described below) from the camera to the accessory.

PGND (protective ground) terminals 152 and 352 are terminals indicating a ground level corresponding to terminals of a mechanical drive system including the motors (actuators) in the camera body 100 and the accessory (for example, the second interchangeable lens 300). More specifically, the PGND terminals 152 and 352 are ground terminals corresponding to the driving power source VBAT.

The VDD terminals 153 and 352 are terminals for supplying a communication control power source (VDD or voltage drain drain) as communication power mainly used for communication control from the camera body 100 to the accessory (for example, the second interchangeable lens 300). The above-described PGND and DGND (digital ground) terminals are ground terminals for connecting various power sources of the camera body 100 and the accessory to the ground level (reference voltage level).

LCLK (local clock) terminals 154 and 354, DLC terminals 155 and 355, and DCL terminals 156 and 356 (described below) are terminals used for communication between the camera body 100 and the camera accessory (for example, the second interchangeable lens 300). The LCLK terminals 154 and 354, the DLC terminals 155 and 355, and the DCL terminals 156 and 356 are communication terminals used for data signal transmission for switching the signal output type between a so-called Complementary Metal Oxide Semiconductor (CMOS) output type and an open type. The CMOS output type according to the present exemplary embodiment has a switch output of both high (Hi) and low (Lo) indicated by a voltage. On the other hand, the open type has a switch output of only low (Lo). As the open type, a so-called open drain type and an open collector type are generally known. However, the open type is not limited thereto, and both types and other types are applicable.

The LCLK terminals 154 and 354 are terminals used to output a communication clock signal from the camera body 100 to the camera accessory and are used by the camera body 100 to monitor a busy state of the accessory. According to the present exemplary embodiment, the LCLK terminals 154 and 354 are connected to the VDD power supply via resistors 110 and 310 in the camera body 100 and the second interchangeable lens 300, respectively.

A BUSY signal output from the accessory is output from the LCLK terminals 154 and 354 to the camera control unit 101 as a BUSY signal via the camera-side communication I/F unit 103. The camera control unit 101 monitors a voltage level of the LCLK terminal 154 by using a BUSY input terminal. For example, in a state where the second interchangeable lens 300 is unable to perform communication (communication disabled), the camera control unit 101 outputs a low voltage level to the LCLK terminal 354. In a state where the second interchangeable lens 300 is able to perform communication (communication enabled), the camera control unit 101 enables the LCLK terminal 354 to input a signal. In this case, a high voltage level is output to a line of the LCLK terminals 154 and 354 on the mount portions of the camera body 100 and the accessory via the pull-up resistors 110 and 310, respectively. More specifically, the LCLK terminal 154 of the camera body 100 indicates the high voltage level. On the other hand, for example, if the camera control unit 101 detects that the LCLK terminal 154 is changed to the high voltage level, the camera control unit 101 recognizes that the second interchangeable lens 300 is able to perform communication (BUSY release state). The low voltage level refers to a voltage level that is lower than or equal to a predetermined voltage level, and the high voltage level refers to a voltage level that is higher than the predetermined voltage level.

The DLC terminals 155 and 355 are terminals used for outputting communication data from an accessory (for example, the second interchangeable lens 300) to the camera body 100. According to the present exemplary embodiment, the DLC terminal 155 is connected to the VDD power supply via a resistor 111 in the camera body 100.

The DCL terminals 156 and 356 are terminals used for performing bidirectional communication of communication data between the camera body 100 and an accessory (for example, the second interchangeable lens 300). According to the present exemplary embodiment, the DCL terminal 356 is connected to the VDD power supply via a resistor 311 in the second interchangeable lens 300.

MIF terminals 157 and 357 are terminals used for detecting that an accessory (for example, the second interchangeable lens 300) is attached to the camera body 100. By the camera control unit 101 detecting the voltage level indicated by the MIF terminal 157, the camera control unit 101 detects that an accessory supported by the camera body 100 is attached thereto or that the accessory is detached from the camera body 100. Then, after the camera control unit 101 detects that the accessory is attached, for example, as a result of the detection, the camera control unit 101 starts the power supply to the power source terminals (VDD and VBAT terminals) and controls to start the communication between the camera body 100 and the camera accessory.

According to the present exemplary embodiment, the MIF terminals 157 and 357 are electrically connected with the DGND terminal (described below) in the second interchangeable lens 300, and therefore provide the same potential. The MIF terminals 157 and 357 are connected to the VDD power supply of the camera power source unit 102 via a resistor 112 in the camera body 100. In this configuration, in a state where the accessory including the second interchangeable lens 300 is not attached, the voltage level indicated by a MIF_IN terminal of the camera control unit 101 is equivalent to power (3.3V) connected to the camera control unit 101. In a state where the accessory including the second interchangeable lens 300 is attached, the MIF_IN terminal of the camera control unit 101 indicates the reference voltage level (e.g., the ground level (0V)) or equivalent. In this way, it becomes possible to detect whether a supported accessory is attached based on the potential level of the MIF_IN terminal.

DGND terminals 158 and 358 are ground terminals corresponding to the VDD power supply for communication control. More specifically, the DGND terminals 158 and 358 indicate the reference voltage level (ground level) corresponding to a predetermined terminal. According to the present exemplary embodiment, grounding refers to setting the voltage level of the ground terminal to approximately the same level (ground level) as the negative pole of a power source such as a battery and does not necessarily indicate a voltage of 0V.

(Detailed Descriptions of First Interchangeable Lens 200)

An internal configuration of the first interchangeable lens 200 according to the present exemplary embodiment will be described in detail below with reference to FIG. 1. The configuration of the camera body 100 is similar to that described above with reference to FIG. 5, and redundant descriptions thereof will be omitted. A lens control unit 201, a lens power source unit 202, and a drive circuit unit 204 in the first interchangeable lens 200 are approximately the same as those in the above-described second interchangeable lens 300, and redundant descriptions thereof will be omitted. Furthermore, a VBAT terminal 251, a PGND terminal 252, a VDD terminal 253, an MIF terminal 257, and a DGND terminal 258 on the second mount portion B of the first interchangeable lens 200 have approximately the same configurations as the identical terminals included in the second interchangeable lens 300, and redundant descriptions thereof will be omitted. In other words, the first interchangeable lens 200 and the second interchangeable lens 300 differ from each other in configurations of the LCLK, DLC, and DCL terminals used for communication.

As illustrated in FIG. 1, according to the present exemplary embodiment, a DLC terminal 255 and a DCL terminal 256 are electrically connected with each other in (the internal circuit of) the first interchangeable lens 200. According to the present exemplary embodiment, even in a case where a lens does not perform communication, outer appearances of the first mount portion A and the second mount portion B are almost identical. This configuration enables use of parts having the same outer appearance as various mount portions attachable to the first mount portion A, thereby resulting in cost reduction. The configuration also enables a user to easily determine whether an interchangeable lens is attachable to the camera body having the first mount portion A. However, for example, the DLC terminal 255 and the DCL terminal 256 on the first interchangeable lens 200 may have an outer appearance not corresponding to the DLC terminal 155 and the DCL terminal 156, respectively, on the camera body 100.

The DLC terminal 255 and the DCL terminal 256 on the first interchangeable lens 200 are desirably electrically connected with the DLC terminal 155 and the DCL terminal 156, respectively, on the camera body 100. Thus, the DLC terminal 255 and the DCL terminal 256 on the first interchangeable lens 200 may be formed of the same metal members connectable to the DLC terminal 155 and the DCL terminal 156 on the camera body 100, respectively.

As illustrated in FIG. 3, an electric circuit unit 210 is newly provided in the first interchangeable lens 200. A signal approximately the same as a signal input from the camera body 100 via the DCL terminal 256 may be output to the DLC terminal 255. The electric circuit unit 210 may be any circuit as long as it is a switching circuit including a buffer circuit and a transistor.

In the internal configuration of the first interchangeable lens 200, a LCLK terminal 254 is not electrically connected with any of one or more terminals and one or more circuits. More specifically, in the first interchangeable lens 200 according to the present exemplary embodiment, the LCLK terminal 254 is a dummy terminal. Thus, the first interchangeable lens 200 may also be configured not to include the LCLK terminal 254.

(VBAT Power Supply Determination Processing for Accessory)

The power supply determination processing performed in a case where an accessory having a mount portion attachable to the first mount portion A of the camera body 100 is attached to the camera will be described below with reference to FIG. 4. This processing determines whether to supply power (VBAT power) from the camera to the accessory. The VBAT power according to the present exemplary embodiment is a driving power source as driving power for operating a mechanical drive unit of an actuator in the accessory, as described above. On the other hand, the VDD power supply is used for controlling communication between the camera body 100 and the accessory connected to the camera body 100.

In step S401, the camera control unit 101 constantly monitors the voltage level MIF_IN of the MIF terminal 157 and determines whether the voltage level MIF_IN is the Lo level. If the camera control unit 101 detects that the voltage level MIF_IN is the Lo level (YES in step S401), the camera control unit 101 determines that an accessory attachable to the first mount portion A has been attached, and the processing proceeds to step S402.

In step S402, the camera power source unit 102 starts supplying power for the accessory (VDD power supply for communication control) to the accessory based on an instruction from the camera control unit 101.

In step S403, the camera control unit 101 clears a BUSY release waiting timer T1 and starts time measurement based on the timer T1. Then, the processing proceeds to step S404. The time measurement with the timer T1 is performed based on a real-time clock (not illustrated) in the camera body 100.

In step S404, the camera control unit 101 monitors the voltage level of the LCLK terminal 154 input via the camera-side communication I/F unit 103, by using the BUSY input terminal. If the camera control unit 101 does not detect a change in the voltage level indicated by the BUSY input terminal from the Hi level to the Lo level (NO in step S404), the processing proceeds to step S405. If the camera control unit 101 detects the change in the voltage level indicated by the BUSY input terminal from the Hi level to the Lo level (YES in step S404), the processing proceeds to step S406. In this case, the camera control unit 101 determines whether the accessory attached to the camera body 100 is BUSY (indicating a BUSY state (processing interruption state)), i.e., the accessory can be supplied with power without communication.

In step S405, the camera control unit 101 determines whether the BUSY release waiting timer T1 has not reached a time-out time T1_MAX of the BUSY release waiting timer T1. The time-out time T1_MAX is stored in advance in the above-described memory.

If the BUSY release waiting timer T1 has not reached the time-out time T1_MAX of the BUSY release waiting timer T1 (YES in step S405), the accessory may not have started. Thus, in this case, the camera control unit 101 continues detecting the change of the BUSY input terminal from the Hi level to the Lo level until the time-out time T1_MAX elapses. If the BUSY release waiting timer T1 has reached the time-out time T1_MAX of the BUSY release waiting timer T1 (NO in step S405), BUSY release waiting time-out occurs, and the processing proceeds to step S406.

In this case, the accessory is configured to release BUSY, i.e., the LCLK terminal 154 indicates the Hi level via the pull-up resistor 110 after the output type of the LCLK terminal 154 is changed to the open type, within a predetermined time period from the time when the accessory becomes BUSY, i.e., the Lo level is output to the LCLK terminal 154. Thus, the time-out time T1_MAX of the BUSY release waiting timer T1 is set to be longer than the predetermined time period, which is from when the accessory becomes BUSY to when it releases BUSY.

If the BUSY release waiting timer T1 has reached the time-out time T1_MAX, the accessory may perform error processing because an activation failure of the accessory or a connection failure of a communication terminal may have occurred. According to the present exemplary embodiment, in consideration of an accessory that does not release BUSY such as an accessory that does not perform communication, the processing proceeds to the subsequent step even if a timeout of the BUSY release waiting timer T1 has occurred.

In step S406, the camera control unit 101 clears a communication start waiting timer T2 and starts time measurement based on the timer T2. Then, the processing proceeds to step S407. The time measurement with the timer T2 is performed based on a real-time clock (not illustrated) provided inside the camera body 100.

In step S407, the camera control unit 101 monitors a voltage level of the DLC terminal 155 input via the camera-side communication I/F unit 103, and determines whether the DLC terminal 155 indicates the Lo level. If the DLC terminal 155 does not indicate the Lo level (NO in step S407), the processing proceeds to step S408. If the DLC terminal 155 indicates the Lo level (YES in step S407), the processing proceeds to step S409.

In step S408, the camera control unit 101 determines whether the communication start waiting timer T2 has not reached a time-out time T2_MAX of the communication start waiting timer T2. If the communication start waiting timer T2 has not reached the time-out time T2_MAX of the communication start waiting timer T2 (YES in step S408), the camera control unit 101 continues monitoring the voltage level of the DLC terminal 155 until the time-out time T2_MAX elapses because the accessory may be in a communication preparation wait state. If the communication start waiting timer T2 has reached the time-out time T2_MAX (NO in step S408), the camera control unit 101 determines that an accessory that does not perform communication (or is unable to perform communication) is attached to the camera body 100, and the processing proceeds to step S411.

In this case, the accessory is configured to set the output of the DLC terminal 155 to the Lo level within a predetermined time period from the time when the accessory becomes BUSY, i.e., the Lo level is output to the LCLK terminal 154. Thus, the time-out time T2_MAX of the communication start waiting timer T2 is set to be longer than the predetermined time period.

In step S409, the camera control unit 101 determines that the accessory attached to the camera body 100 is an accessory capable of performing communication (communication type accessory) (for example, the second interchangeable lens 300). Then, the processing proceeds to step S410. In step S410, the camera control unit 101 communicates with the lens control unit 301 and, based on accessory information acquired through communication, controls the camera power source unit 102 to start supplying the VBAT power to the accessory via the VBAT terminal 151.

In step S411, the camera control unit 101 outputs a Lo pulse from the DCL terminal 156 by changing a voltage level of an output signal from Hi to Lo and to Hi again, and at the same time, monitors a voltage level of an input signal indicated by the DLC terminal 155. In the case of the first interchangeable lens 200 illustrated in FIG. 1, the DLC terminal 255 and the DCL terminal 256 are electrically connected with each other in the first interchangeable lens 200. Thus, a signal having approximately the same voltage level as the signal input to the DCL terminal 256 is output to the DLC terminal 255 of the first interchangeable lens 200. As an internal circuit of the first interchangeable lens 200, the DCL terminal 256 and the DLC terminal 255 are electrically connected, for example, with flexible printed wiring. Thus, a difference may arise between the voltage levels indicated by the DCL terminal 256 and the DLC terminal 255 due to an electrical loss in the wiring; however, in the present exemplary embodiment, the difference is ignored as a minute difference. In actuality, when the difference between the voltages indicated by the DCL terminal 256 and the DLC terminal 255 is within a predetermined tolerance, these voltages are determined to be approximately the same.

In step S412, the camera control unit 101 determines whether the voltage level of the input signal indicated by the DLC terminal 155 is approximately the same as (or is detected to indicate approximately the same signal variation as) the voltage level of the output signal (Lo pulse) from the DCL terminal 156. In other words, the camera control unit 101 determines whether the input signal of the DLC terminal 155 changes in synchronization with the output signal of the DCL terminal 156. If the camera control unit 101 determines that the input signal indicated by the DLC terminal 155 is approximately the same as the output signal of the DCL terminal 156 (YES in step S412), the processing proceeds to step S413. If the camera control unit 101 determines that the input signal indicated by the DLC terminal 155 is not approximately the same as the output signal of the DCL terminal 156 (NO in step S412), the processing proceeds to step S415.

In step S413, the camera control unit 101 determines that the accessory attached to the camera body 100 does not perform communication but can be supplied with power (non-communication and power-supply type accessory). Then, the processing proceeds to step S414. In step S414, the camera control unit 101 controls the camera power source unit 102 to start the power supply to the accessory via the VBAT terminal 151.

In step S415, the camera control unit 101 determines that the accessory attached to the camera body 100 neither performs communication nor can be supplied with power (non-communication and non-power-supply type accessory). In this case, the camera control unit 101 neither performs the VBAT power supply nor communication between the camera body 100 and the accessory in the subsequent processing, and ends the power supply determination processing. In the present exemplary embodiment, even if the camera control unit 101 determines that the accessory attached to the camera body 100 is a non-communication and non-power-supply type accessory in step S415, the camera control unit 101 continues the VDD power supply to the accessory. This is because, in anticipation of attachment and detachment of the accessory attached to the camera body 100, the accessory may possibly use the VDD power supply to continue the detection of the accessory based on the signal output from the MIF terminal 157. However, the present exemplary embodiment is not limited thereto. To reduce the power consumption, the present exemplary embodiment may be configured to interrupt the VDD power supply to the accessory after completion of the processing in step S415.

In the above-described configuration of a non-communication and VBAT-power-supply type accessory, for example, the DLC terminal 255 and the DCL terminal 256 are electrically connected with each other in the first interchangeable lens 200. However, the present exemplary embodiment is not limited thereto. For example, as long as a terminal used to output a signal from the image capturing apparatus and a terminal used to input a signal to the image capturing apparatus are combined, any terminals may be electrically connected with each other. For example, the LCLK terminal 254 and the DLC terminal 255 may be electrically connected only with each other in the first interchangeable lens 200. In this case, the internal configuration of the camera body 100 may be suitably modified.

Figure 6:
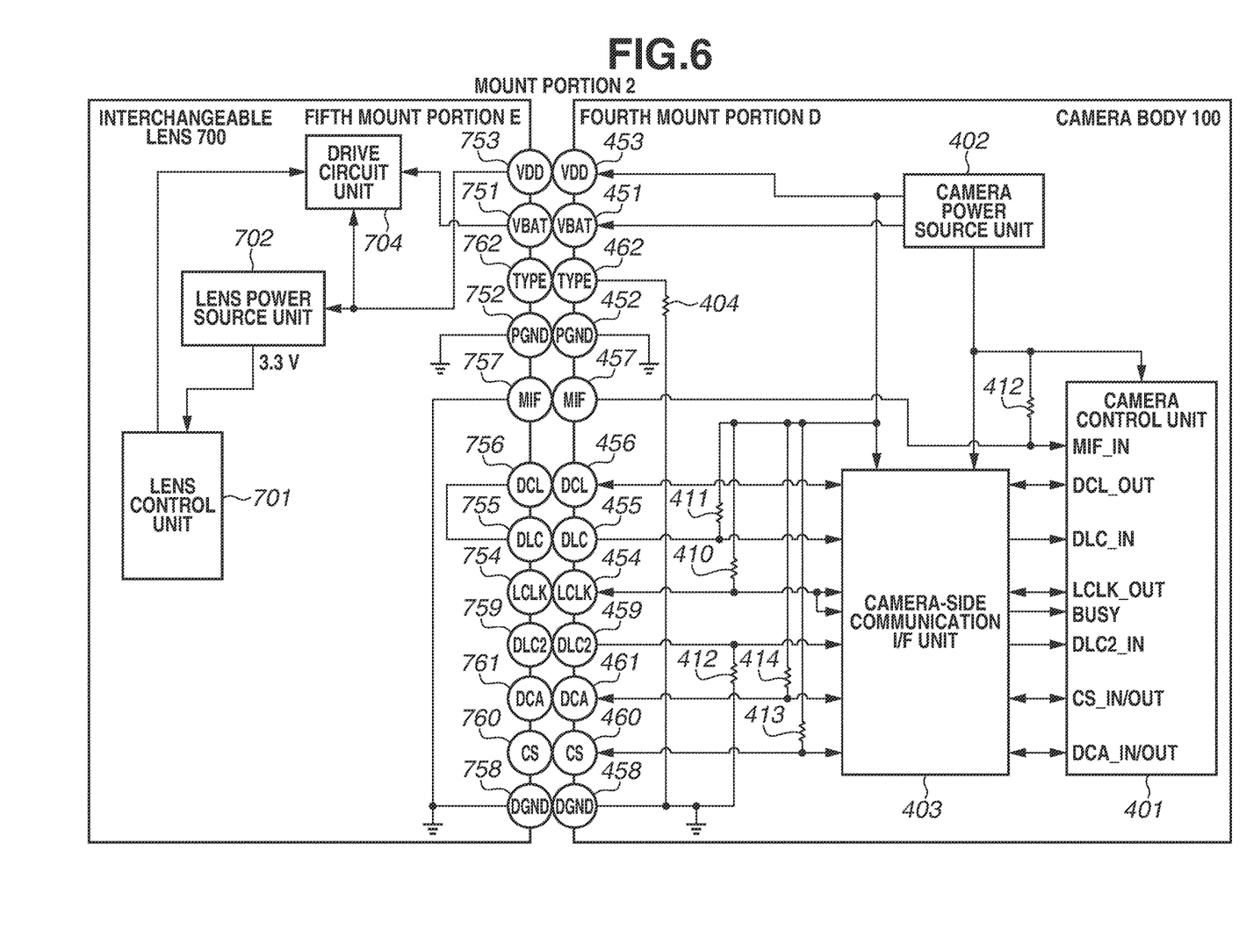
FIG. 6 is a block diagram illustrating an example of internal configurations of a camera and a camera accessory where an interchangeable lens type second camera body and a third interchangeable lens are connected with each other according to a modification of the first exemplary embodiment of the present disclosure.

A modification of the above-described first exemplary embodiment will be described below with reference to FIGS. 6 and 7. The configuration of the first interchangeable lens 200 is similar to that according to the first exemplary embodiment, and a redundant description thereof will be omitted. FIG. 6 is a block diagram illustrating an example of internal configurations of a camera and a camera accessory where an interchangeable lens type second camera body 400 and a third interchangeable lens 700 are connected with each other according to a modification of the first exemplary embodiment of the present disclosure.

As illustrated in FIG. 6, the second camera body 400 includes a fourth mount portion D as a mount portion different from the mount portion of the camera body (first camera body) 100 according to the first exemplary embodiment. A camera control unit 401, a camera power source unit 402, and a camera-side communication I/F unit 403 are approximately the same as the camera control unit 101, the camera power source unit 102, and the camera-side communication I/F unit 103, respectively, in the above-described camera body 100, and redundant descriptions thereof will be omitted.

As illustrated in FIG. 6, the third interchangeable lens 700 includes a fifth mount portion E as a mount portion different from the mount portions of the above-described first interchangeable lens 200 and second interchangeable lens 300. A lens control unit 701, a lens power source unit 702, and a drive circuit unit 704 are approximately the same as the lens control unit 201, the lens power source unit 202, and the drive circuit unit 204, respectively, in the above-described first interchangeable lens 200, and redundant descriptions thereof will be omitted.

The third interchangeable lens 700 and an intermediate adapter 900 (described below) are accessories that can be directly connected to the second camera body 400 having the fourth mount portion D. The attachment and detachment of an accessory to and from the image capturing apparatus are achieved by connection (bayonet connection) between bayonet claw groups (not illustrated) on both of the mount portions. The mount portion of the second camera body 400 and the mount portion of the accessory detachably attached to the second camera body 400 are collectively referred to as a mount portion 2.

As illustrated in FIG. 6, the mount portion 2 is provided with the terminals of the mount portion 1 illustrated in FIG. 1 and a plurality of additional terminals, which are DLC2 terminals, CS terminals, DCA terminals, and TYPE terminals. In addition, arrangements of the plurality of terminals are different between the mount portion 1 and the mount portion 2.

Three terminals (DLC2 terminals 459 and 759, CS terminals 460 and 760, and DCA terminals 461 and 761) other than TYPE terminals 462 and 762 among the terminals added to the mount portion 2 are used for communication between the image capturing apparatus and the accessory. A VBAT terminal 451, a PGND terminal 452, a VDD terminal 453, a LCLK terminal 454, a DLC terminal 455, a DCL terminal 456, an MIF terminal 457, and a DGND terminal 458 are approximately the same as the terminals with the same name on the camera body 100, and redundant descriptions thereof will be omitted. Likewise, a VBAT terminal 751, a PGND terminal 752, a VDD terminal 753, a LCLK terminal 754, a DLC terminal 755, a DCL terminal 756, an MIF terminal 757, and a DGND terminal 758 are approximately the same as the terminals with the same name on the first interchangeable lens 200, and redundant descriptions thereof will be omitted.

In the second camera body 400, the DLC2 terminal 459 is electrically connected with the DGND terminal 458 via a resistor 412. The CS terminal 460 and the DCA terminal 461 are connected to the camera power source unit 402 via resistors 413 and 414, respectively, and are electrically connected with the VDD power supply for communication control. The TYPE terminal 462 is electrically connected with the DGND terminal 458 via a resistor 404. Similar to the above-described camera body 100, the LCLK terminal 454 and the DLC terminal 455 are connected to the camera power source unit 402 via resistors 410 and 411, respectively, and are electrically connected with the VDD power supply for communication control.

In the third interchangeable lens 700 according to the present modification, the DLC terminal 755 and the DCL terminal 756 are electrically connected only with each other, similar to the first interchangeable lens 200 according to the first exemplary embodiment. Thus, also when the third interchangeable lens 700 is attached to the second camera body 400, the power supply determination processing can be performed similar to the first exemplary embodiment, and the third interchangeable lens 700 can be determined to be a non-communication and VBAT-power-supply type accessory.

In the above-described configuration of a non-communication and VBAT-power-supply type accessory, for example, the DLC2 terminal 759 and the DCL terminal 756 may be electrically connected with each other. More specifically, as long as a terminal used to output a signal from the image capturing apparatus and a terminal used to input a signal to the image capturing apparatus are combined, any terminals may be electrically connected with each other.

Figure 7:
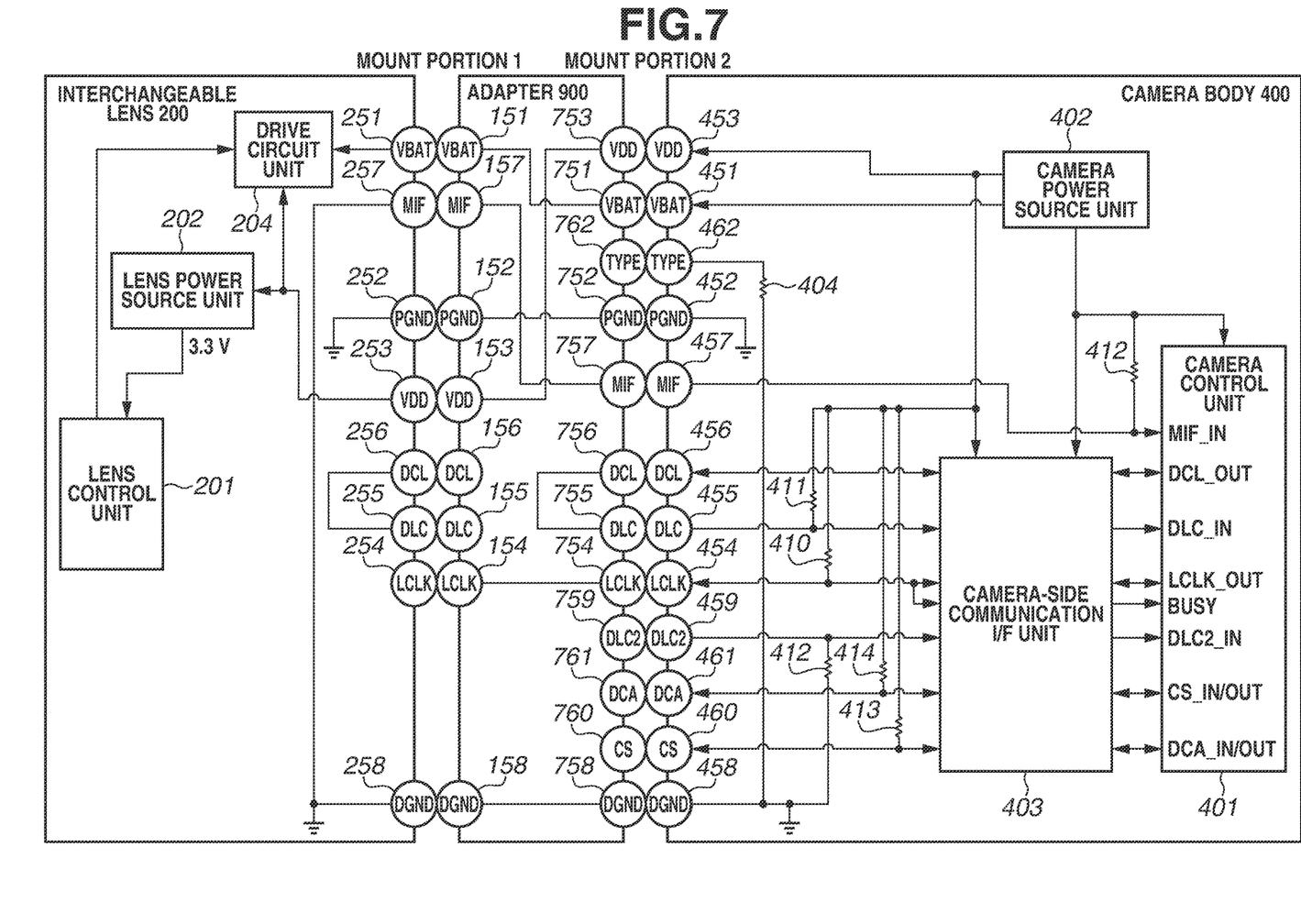
FIG. 7 is a block diagram illustrating an example of an internal configuration of a camera system including the second camera body and the first interchangeable lens connected with each other via an adapter according to a modification of the first exemplary embodiment of the present disclosure.

As illustrated in FIG. 7, even if the accessory attached to the image capturing apparatus is an accessory other than the interchangeable lens, the above-described power supply determination processing can be performed. FIG. 7 is a block diagram illustrating an example of an internal configuration of a camera system including the second camera body 400 and the first interchangeable lens 200 connected with each other via the intermediate adapter 900 according to a modification of the first exemplary embodiment of the present disclosure.

FIG. 7 illustrates an example of a camera system in a state where the second camera body 400 and the first interchangeable lens 200 are indirectly connected by the intermediate adapter (conversion adapter) 900 for indirectly connecting between them. Thus, the intermediate adapter 900 includes a fifth mount portion E directly connectable with the fourth mount portion D of the second camera body 400 on one side, and the first mount portion A directly connectable with the first interchangeable lens 200 on the other side. The intermediate adapter 900 includes terminals that are the same as the plurality of terminals of the above-described third interchangeable lens 700 on a side of the fifth mount portion E, and terminals that are the same as the plurality of terminals of the above-described camera body 100 on a side of the first mount portion A.

As illustrated in FIG. 7, the DLC terminal 755 and the DCL terminal 756 among the plurality of terminals on the intermediate adapter 900 are electrically connected only with each other in the intermediate adapter 900. This configuration makes it possible to perform the above-described power supply determination processing even if the accessory attached to the image capturing apparatus is an accessory other than an interchangeable lens, such as in a case where an adapter is attached to the image capturing apparatus.

The descriptions below are based on the premise that the above-described first interchangeable lens 200 is attached at the front of the intermediate adapter 900. In this case, for example, the DLC terminal 755 and the DLC terminal 155 of the intermediate adapter 900 may be electrically connected (by a through connection), and the DCL terminal 756 and the DCL terminal 156 may be electrically connected (by a through connection).

A second exemplary embodiment of an image capturing system related to an image capturing apparatus and an accessory that can be attached to and detached from the image capturing apparatus of the present disclosure will be described below with reference to FIGS. 8 and 9.

Figure 8:
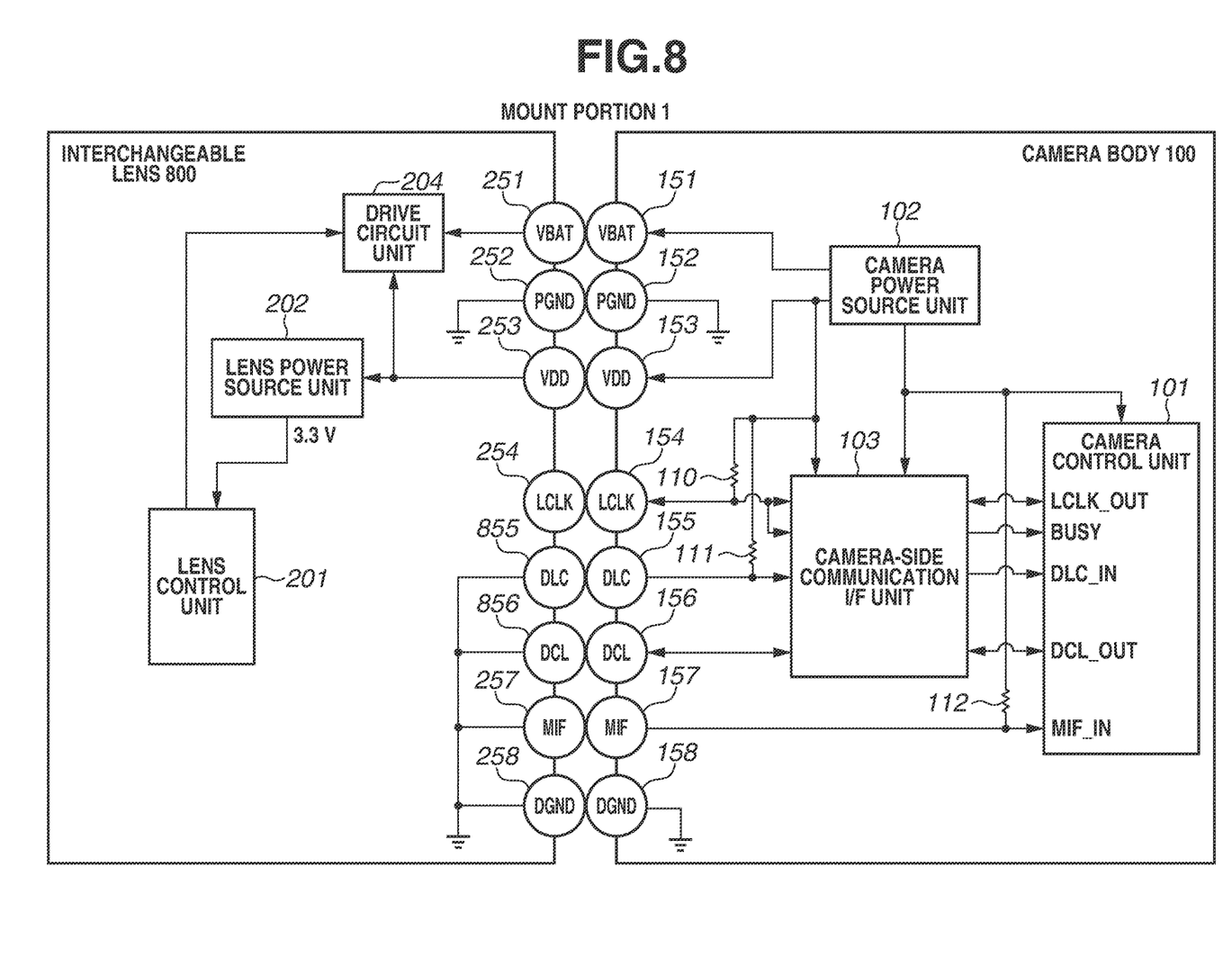
FIG. 8 is a block diagram illustrating internal configurations of a camera and a camera accessory where the interchangeable lens type camera body and a fourth interchangeable lens are connected with each other according to a second exemplary embodiment of the present disclosure.
Figure 9:
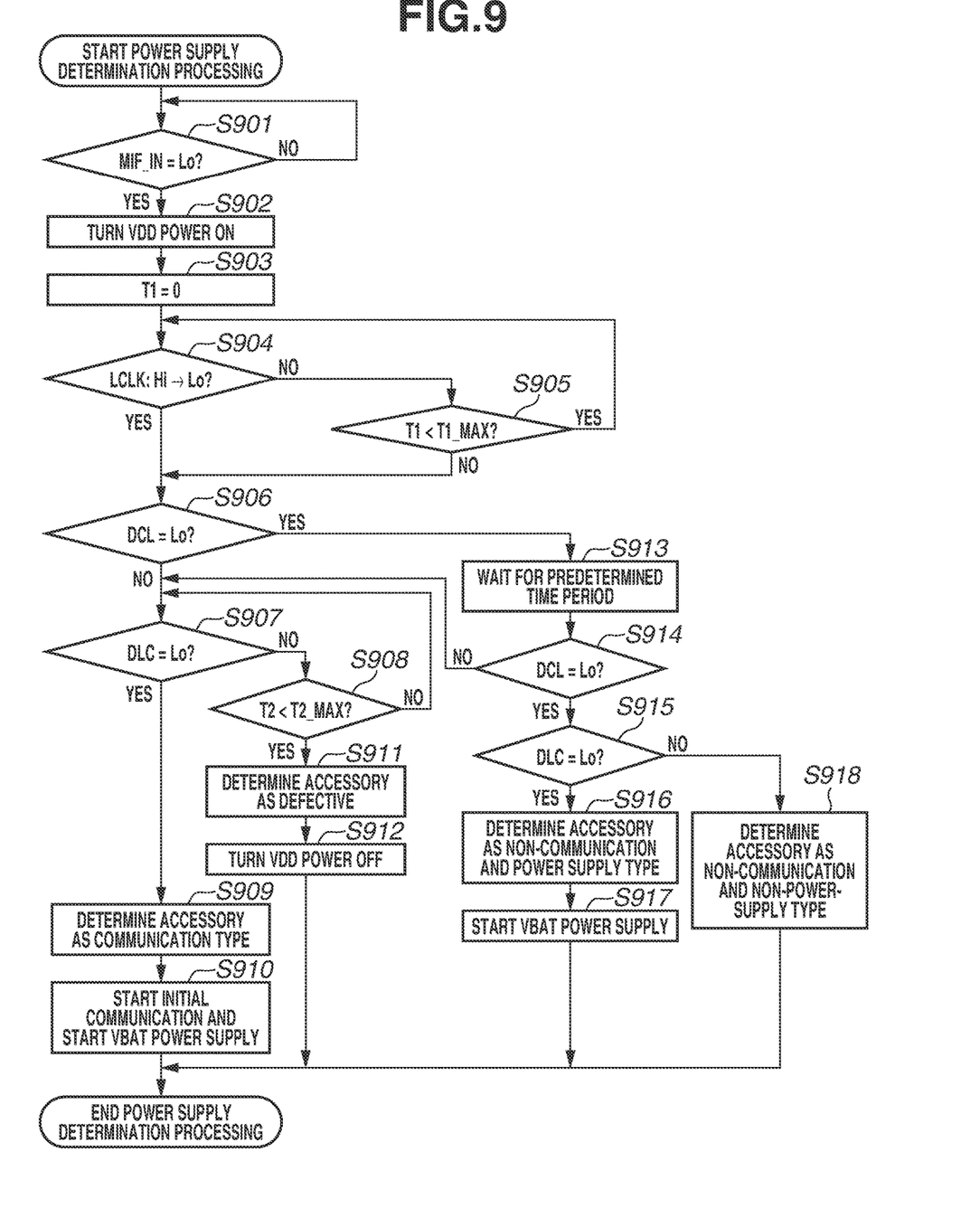
FIG. 9 is a flowchart illustrating power supply determination processing according to the second exemplary embodiment of present disclosure.

FIG. 8 is a block diagram illustrating internal configurations of a camera and a camera accessory where the interchangeable lens type camera body 100 and a fourth interchangeable lens 800 are connected with each other according to the second exemplary embodiment of the present disclosure. The configuration of the camera body 100 is identical to the configuration according the above-described first exemplary embodiment, and a redundant description thereof will be omitted. For the fourth interchangeable lens 800, components identical to those of the first interchangeable lens 200 according to the first exemplary embodiment are indicated with the same reference numerals, and redundant descriptions thereof will be omitted. As illustrated in FIG. 8, the fourth interchangeable lens 800 differs from the first interchangeable lens 200 in that, among the plurality of terminals, not only a DLC terminal 855 and a DCL terminal 856 are electrically connected but also the DGND terminal 258 may be electrically connected therewith. In other words, the DLC terminal 855 and the DCL terminal 856 are connected to the ground level (reference voltage level) inside the fourth interchangeable lens 800.

As described above in the first exemplary embodiment, the DLC terminal 855 and the DCL terminal 856 of the fourth interchangeable lens 800 may be electrically connected with the DLC terminal 155 and the DCL terminal 156, respectively, of the camera body 100. According to the present exemplary embodiment, as illustrated in FIG. 3 of the above-described first exemplary embodiment, an electric circuit unit may be provided inside the interchangeable lens 800, and a potential level similar to that of the DGND terminal 258 may be output to the DCL terminal 856 and the DLC terminal 855.

The power supply determination processing performed when the fourth interchangeable lens 800 is attached to the camera body 100 according to the second exemplary embodiment of the present disclosure will be described below with reference to FIG. 9. This processing determines whether to supply power (VBAT power) from the camera to the accessory. FIG. 9 is a flowchart illustrating the power supply determination processing according to the second exemplary embodiment of the present disclosure. Processing in steps S901 to S905 illustrated in FIG. 9 is similar to the processing in steps S401 to S405 illustrated in FIG. 4, respectively, according to the above-described first exemplary embodiment, and redundant descriptions thereof will be omitted.

In step S906, the camera control unit 101 monitors the voltage level of the DCL terminal 156 input via the camera-side communication I/F unit 103 and determines whether the DCL terminal 156 indicates the Lo level. Cases where the DCL terminal 156 indicates the Lo level include a case where, as described above, BUSY release is detected with the BUSY input terminal of the camera control unit 101 and a case where BUSY release waiting time-out occurs. If the voltage level indicated by the DCL terminal 156 is not the Lo level (NO in step S906), the processing proceeds to step S907. If the voltage level indicated by the DCL terminal 156 indicates the Lo level (YES in step S906), the processing proceeds to step S913.

In a case where the fourth interchangeable lens 800 is attached to the camera body 100, the DCL terminal 856 is electrically connected with the DGND terminal 258, and therefore the voltage level of the DCL terminal 856 indicates the Lo level. On the other hand, in a case where the second interchangeable lens 300 illustrated in FIG. 5 is attached to the camera body 100, the DCL terminal 356 is connected to a VDD terminal 353 (i.e., VDD power supply) via the resistor 311, and therefore the DCL terminal 356 indicates the Hi level. Similar to the first interchangeable lens 200 according to the above-described first exemplary embodiment, this configuration enables the camera body 100 to detect the fourth interchangeable lens 800 as a non-communication and VBAT-power-supply type accessory. Detection of the accessory will be described in detail below.

Processing in steps S907 to S910 is similar to the processing in steps S407 to S410 illustrated in FIG. 4 according to the above-described first exemplary embodiment, and redundant descriptions thereof will be omitted. If the camera control unit 101 determines that the communication start waiting timer T2 has not reached the time-out time T2_MAX of the communication start waiting timer T2 (YES in step S908), the processing proceeds to step S911. In step S911, the camera control unit 101 determines that an accessory having a communication failure is attached to the camera body 100, and performs various error processing. Then, the processing proceeds to step S912. If the camera control unit 101 determines that the communication start waiting timer T2 has reached the time-out time T2_MAX of the communication start waiting timer T2 (NO in step S908), the accessory attached to the camera body 100 may be in a communication preparation wait state. Thus, according to the present exemplary embodiment, the camera control unit 101 repeats the processing in steps S907 and S908.

In step S912, the camera control unit 101 controls the camera power source unit 102 to stop the VDD power supply to the accessory via the VDD terminal 153. According to the present exemplary embodiment, if the camera control unit 101 determines that the accessory caused a communication failure, the camera control unit 101 interrupts the VDD power supply to the accessory and ends the power supply determination processing. However, the present exemplary embodiment is not limited thereto. For example, the processing can return to step S902 from the processing at least in step 911 and subsequent steps so that the camera control unit 101 can perform a retry processing from turning the VDD power supply ON.

If the DCL terminal 156 indicates the Lo level (YES in step S906), the processing proceeds to step S913. In step S913, the camera control unit 101 waits for a predetermined time period. Then, the processing proceeds to step S914. In step S914, the camera control unit 101 checks the voltage level of the DCL terminal 156 again. If the voltage level of the DCL terminal 156 indicates the Lo level (YES in step S914), the processing proceeds to step S915. If the DCL terminal 156 does not indicate the Lo level (NO in step S914), the processing proceeds to step S907. While in the above descriptions, the camera control unit 101 waits for the predetermined time period and checks the voltage level of the DCL terminal 156 again in steps S913 and S914, the camera control unit 101 can also continuously detect (monitor) the voltage level of the DCL terminal 156 during the predetermined time period.

In step S915, the camera control unit 101 determines whether the voltage level of the DLC terminal 155 input via the camera-side communication I/F unit 103 indicates the Lo level. If the DLC terminal 155 does not indicate the Lo level (NO in step S915), the processing proceeds to step S918. If the DLC terminal 155 indicates the Lo level (YES in step S915), the processing proceeds to step S916. Processing in the subsequent steps S916 to S918 is similar to the processing in steps S413 to step S415 illustrated in FIG. 4 according to the above-described first exemplary embodiment, and redundant descriptions thereof will be omitted. More specifically, in a case where the DLC terminal 155 does not indicate the Lo level, the camera control unit 101 determines that the accessory attached to the camera body 100 does not perform communication but can be supplied with power (non-communication and power-supply type accessory). In a case where the DLC terminal 155 indicates the Lo level, the camera control unit 101 determines that the accessory attached to the camera body 100 neither performs communication nor is supplied with power (non-communication and non-power-supply type accessory).

As described above, in the image capturing system related to the image capturing apparatus and the accessory according to the present exemplary embodiment, the image capturing apparatus can correctly/accurately determine a type of the attached accessory from among a variety of accessories attachable to the image capturing apparatus without increasing a circuit scale of the system. According to the determined type of the accessory, the image capturing apparatus can correctly/accurately control the presence or absence of communication and power supply (VBAT power) between the image capturing apparatus and the accessory. In particular, in a case where a power-supply type accessory is attached to the image capturing apparatus, the image capturing apparatus can correctly/accurately supply power to the accessory regardless of whether the accessory is a communication type accessory.

While the present disclosure has been described based on the above-described exemplary embodiments, the present disclosure is not limited thereto but can be modified and changed in various ways within the scope of the appended claims. For example, the exemplary embodiments have been described above using a digital camera as an example of the image capturing apparatus; however, the exemplary embodiments are also applicable to an image capturing apparatus other than a digital camera, such as a digital video camera and a security camera.

The exemplary embodiments have been described using the interchangeable lens and the adapter as examples of the camera accessories according to the present disclosure. However, the present disclosure is not limited thereto. For example, as the (camera) accessory attachable to and detachable from an image capturing apparatus, an apparatus other than the above-described apparatuses can also be used as long as the apparatus can be directly or indirectly connected (attached) to the mount portion of the image capturing apparatus.

The image capturing apparatus and the accessory according to the above-described exemplary embodiments each include the mount portion having a terminal that can be a contact surface or a contact pin. For example, the mount portion of the image capturing apparatus can include a plurality of contact pins, and the mount portion of the accessory can include a plurality of contact surfaces respectively corresponding to the above-described plurality of contact pins.

In the above-described exemplary embodiments, a control unit (for example, the lens control unit 201 in the first interchangeable lens 200) is included in the accessory. However, the present disclosure is not limited thereto. For example, the accessory can include no control unit, and can be configured to operate only based on an instruction and power supply from the image capturing apparatus.

In the above-described exemplary embodiments, the camera control unit 101 in the camera body 100 can be configured to suitably change the VBAT voltage based on an amount of power that can be supplied to the accessory. In this case, the drive circuit unit in the accessory has a function of monitoring the voltage level of the VBAT power (described below) supplied from the image capturing apparatus, and notifies the control unit in the accessory of the voltage level of the VBAT power. The control unit determines the amount of power that can be used by the lens based on the voltage level of the VBAT power source. This configuration eliminates or at least works towards eliminating the need for notifying information about the supplied power through the communication between the image capturing apparatus and the accessory, and enables the accessory to grasp the amount of power that can be used by the accessory.

According to the above-described exemplary embodiments, the mount portion on each of the image capturing apparatus and the accessory may have a different terminal arrangement from the above-described one as long as a pair of directly connectable (attachable) terminals have the same arrangement. On the mount portions according to the exemplary embodiments of the present disclosure, the plurality of terminals used for signal transmission and reception between the image capturing apparatus and the accessory attachable to the image capturing apparatus can be arranged in any form as long as the terminals are electrically connected with each other in the accessory.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-234729, filed Dec. 14, 2018, which is hereby incorporated by reference herein in its entirety.

What is claimed is:

1. An image capturing apparatus detachably attached with an accessory, the image capturing apparatus comprising:
a plurality of terminals including a terminal used for electrical connection with the accessory;
a first mount portion connectable with a second mount portion on the accessory;
one or more processors; and
a memory storing instructions that, when executed by the one or more processors, cause the image capturing apparatus to perform operations including:
controlling the plurality of terminals,
wherein the plurality of terminals includes a first terminal, a second terminal, and a third terminal,
wherein the first terminal is configured to be used to output a signal from the image capturing apparatus to the accessory, the second terminal is configured to be used to input a signal output from the accessory to the image capturing apparatus, and the third terminal is configured to be used to supply first power to the accessory, and
wherein controlling includes detecting a second signal as a signal input to the second terminal when a first signal is output to the first terminal and, in a case where it is detected that the second signal is a signal changing in synchronization with the first signal, controlling includes supplying the first power to the accessory via the third terminal.

2. The image capturing apparatus according to claim 1, wherein the first and the second terminals are communication terminals used for communication between the image capturing apparatus and the accessory,
wherein the first signal is a data signal output from the image capturing apparatus to the accessory, and
wherein the second signal is data signal input to the image capturing apparatus from the accessory.

3. The image capturing apparatus according to claim 1, wherein, in a case where the second signal is not a signal changing in synchronization with the first signal, controlling includes not supplying the first power to the accessory.

4. The image capturing apparatus according to claim 3, wherein the plurality of terminals includes a fourth terminal configured to be used to supply second power different from the first power to the accessory, and a fifth terminal configured to be used to detect that the accessory is attached to the image capturing apparatus, and
wherein, after detecting that the accessory is attached to the image capturing apparatus by using the fifth terminal, controlling includes starting the supply of the second power to the accessory by using the fourth terminal and inputting and outputting signals by using the first and the second terminals.

5. The image capturing apparatus according to claim 4, wherein the plurality of terminals includes a sixth terminal different from the first terminal and configured to be used to allow signal output from the image capturing apparatus to the accessory, and
wherein, in a case where the sixth terminal does not indicate a first voltage level or less than the first voltage level within a predetermined time from when supplying of the second power to the accessory is started by using the fourth terminal, or in a case where the second terminal does not indicate a second voltage level or less than the second voltage level within a predetermined time from when the sixth terminal indicates the first voltage level or less, controlling includes outputting the first signal to the accessory via the first terminal.

6. The image capturing apparatus according to claim 5, wherein, in a case where the second signal is not a signal changing in synchronization with the first signal, controlling includes interrupting supplying of the second power to the accessory.

7. The image capturing apparatus according to claim 4, wherein the second power is power for controlling communication between the image capturing apparatus and the accessory.

8. The image capturing apparatus according to claim 1, wherein the first power is a power source for driving an actuator in the accessory or an actuator in an interchangeable lens attached to the accessory.

9. The image capturing apparatus according to claim 1, wherein the accessory is an interchangeable lens or an adapter directly connectable to the image capturing apparatus.

10. The image capturing apparatus according to claim 1, wherein, in a case where the first power is supplied from the image capturing apparatus to the accessory via the third terminal, controlling includes changing the first power to a voltage level corresponding to power that can be supplied by the image capturing apparatus and supplies the first power to the accessory.

11. An accessory attachable to and detachable from an image capturing apparatus, the accessory comprising:
a second mount portion connectable with a first mount portion on the image capturing apparatus; and
a plurality of terminals including a terminal configured to be used for electrical connection with the image capturing apparatus,
wherein the plurality of terminals includes a first terminal, a second terminal, and a third terminal,
wherein the first terminal is configured to be used to input a signal output from the image capturing apparatus, the second terminal is configured to be used to output a signal to the image capturing apparatus, and the third terminal is configured to be used when first power is supplied from the image capturing apparatus,
wherein, in order for the image capturing apparatus to be able to determine whether to supply the first power to the accessory, the first and the second terminals are electrically connected with each other in the accessory, and
wherein the second terminal is configured to output, to the image capturing apparatus, an output signal in synchronization with a signal input from the image capturing apparatus via the first terminal.

12. The accessory according to claim 11, further comprising an electric circuit configured to output, based on the signal input via the first terminal, the signal in synchronization with the signal input via the first terminal to the second terminal.

13. A method for controlling an image capturing apparatus detachably attached with an accessory, wherein the image capturing apparatus includes a plurality of terminals including a terminal used for electrical connection with the accessory, and a first mount portion connectable with a second mount portion on the accessory, the method comprising:
    controlling the plurality of terminals,
        wherein the plurality of terminals includes a first terminal, a second terminal, and a third terminal,
        wherein the first terminal is configured to be used to output a signal from the image capturing apparatus to the accessory, the second terminal is configured to be used to input a signal output from the accessory to the image capturing apparatus, and the third terminal is configured to be used to supply first power to the accessory, and
        wherein controlling includes detecting a second signal as a signal input to the second terminal when a first signal is output to the first terminal and, in a case where it is detected that the second signal is a signal changing in synchronization with the first signal, controlling includes supplying the first power to the accessory via the third terminal.

14. A non-transitory computer-readable storage medium storing a program for causing a processor to execute a method for controlling an image capturing apparatus detachably attached with an accessory, wherein the image capturing apparatus includes a plurality of terminals including a terminal used for electrical connection with the accessory, and a first mount portion connectable with a second mount portion on the accessory, the method comprising:
    controlling the plurality of terminals,
        wherein the plurality of terminals includes a first terminal, a second terminal, and a third terminal,
        wherein the first terminal is configured to be used to output a signal from the image capturing apparatus to the accessory, the second terminal is configured to be used to input a signal output from the accessory to the image capturing apparatus, and the third terminal is configured to be used to supply first power to the accessory, and
        wherein controlling includes detecting a second signal as a signal input to the second terminal when a first signal is output to the first terminal and, in a case where it is detected that the second signal is a signal changing in synchronization with the first signal, controlling includes supplying the first power to the accessory via the third terminal.

\* \* \* \* \*